(12) United States Patent
Gretz

(10) Patent No.: US 6,921,861 B1
(45) Date of Patent: *Jul. 26, 2005

(54) TWO-WAY ELECTRICAL BOX COVER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/957,764

(22) Filed: Oct. 4, 2004

Related U.S. Application Data

(63) Continuation of application No. 10/647,416, filed on Aug. 25, 2003, now Pat. No. 6,806,426.

(51) Int. Cl.[7] .................................................. H02G 3/14
(52) U.S. Cl. .............................. 174/67; 174/48; 174/57; 220/242
(58) Field of Search .............................. 174/66, 67, 61, 174/54, 50; 220/241, 242, 3.8, 4.02; D8/353; D13/177

(56) References Cited

U.S. PATENT DOCUMENTS

| | | | | |
|---|---|---|---|---|
| 4,740,655 A | * | 4/1988 | Ford ............................. | 174/67 |
| 5,148,348 A | * | 9/1992 | White ......................... | 361/658 |
| 5,218,169 A | * | 6/1993 | Riceman ....................... | 174/67 |
| 5,389,740 A | * | 2/1995 | Austin ........................... | 174/67 |
| 6,028,268 A | * | 2/2000 | Stark et al. ................... | 174/67 |
| 6,576,838 B2 | * | 6/2003 | Matsumura .................. | 174/66 |
| 6,616,005 B1 | * | 9/2003 | Pereira et al. .............. | 220/241 |

* cited by examiner

*Primary Examiner*—Dhiru R. Patel

(57) ABSTRACT

A two-way cover for protecting electrical devices in either horizontally or vertically oriented exterior electrical junction boxes. The two-way cover includes an assembly having a base member, middle member, and outer member. An arrangement is included for securing the base member to an electrical box. The outer member is rotatably attached to the assembly to form a first rotational cover unit. The middle member is also rotatably attached to the assembly such that the outer member and the middle member form a second rotational cover unit. The first rotational cover unit is capable of rotation in a first direction with respect to the assembly and the second rotational cover unit is capable of rotation in a second direction with respect to the assembly. When the assembly is secured to a vertically oriented junction box, the first rotational cover unit may be opened and closed to provide access to the box. When the assembly is secured to a horizontally oriented junction box, the second rotational cover unit may be opened and closed to provide access to the box. The two-way cover therefore provides a simple and convenient assembly for covering an outdoor electrical box oriented either vertically or horizontally without the need for separate inserts or removable tabs and hinges to accommodate the separate orientations.

2 Claims, 10 Drawing Sheets

TWO-WAY ELECTRICAL BOX COVER

This application is a Continuation of U.S. patent application Ser. No. 10/647,416 entitled Two-Way Electrical Box Cover filed Aug. 25, 2003, now U.S. Pat. No. 6,806,426.

FIELD OF THE INVENTION

This invention relates to cover assembly for outdoor electrical junction boxes and specifically to a two-way opening electrical box cover that can be used to provide a weatherproof cover for an electrical junction box mounted in either a vertical or horizontal orientation.

BACKGROUND OF THE INVENTION

Electrical junction boxes are commonly mounted on the exterior vertical walls of buildings to provide electrical devices such as duplex receptacles or outlets to service various outdoor appliances. Some of the appliances are of the type, such as pumps and mosquito traps, that are commonly left plugged into the outlet for extended periods of time and through all types of weather conditions. It is therefore desirable in this situation to keep the electrical cord for the appliance plugged into the outlet while providing protection to the receptacle against rain, water spray, and other inclement conditions that may be encountered in a typical outdoor setting.

Various attempts have therefore been made to provide weatherproof covers for exterior junction boxes. U.S. Pat. No. 4,424,407 (hereinafter the '407 patent), for example, provided an electrical outlet safety cover having a top dimensioned to fit over an electrical outlet and define a closed space of sufficient size to include a plug inserted therein. The top included an opening through which an electrical cord could pass. Although the safety cover of the '407 patent provided protection for an outlet mounted in a vertically mounted electrical junction box, it was limited to protecting a vertically mounted box. If the safety cover of the '407 patent were installed on a horizontally-mounted electrical junction box, the plug openings in the cover would be oriented to the side, therefore allowing rain or water spray to enter the cover. The safety cover of the '407 patent was therefore inadequate for protecting a horizontally oriented electrical junction box.

U.S. Pat. No. 5,280,135 (hereinafter the '135 patent) attempted to solve this problem by providing an outdoor weatherproof protecting electrical outlet cover adapted to be attached in weatherproof connection to an electrical outlet. It included a gasket, a base plate, an insert, and a protective housing with gaps for accommodating electrical cords. The insert was sized and adapted to fit within an aperture in the base plate in one of two orientations, depending on the orientation of the electrical junction box it was used in conjunction with. The insert was capable of being rotated 90° to accommodate either a vertically or horizontally oriented box while the protective housing remained oriented vertically to allow the gaps to be positioned downward. Although the '135 patent provided a protective cover capable of accommodating both vertical and horizontal electrical junction boxes, the design was mechanically complex, relying upon a gasket, a base plate, an insert, and a protective housing to provide the desired protection.

Another attempt to provide protection to exterior electrical junction boxes was that proposed by U.S. Pat. No. 5,763,831 (hereinafter the '831 patent). This patent provided a method and apparatus for converting a universal cover plate for an electrical outlet to any desired specific cover plate. The apparatus included a base having a long and short side and removable tabs and hinges on both the long and short sides. Depending on the orientation of the electrical junction box, tabs were removed on the appropriate side to accommodate the box. A cover was provided with removable hinges that allowed the cover to open along more than one axis. To accommodate a horizontally oriented electrical junction box, the tabs on the short side of the base and the hinges on the short side of the cover are removed by prying, sawing, or cutting. Alternatively, to accommodate a vertically oriented electrical junction box, the tabs on the long side of the base and the hinges on the long side of the cover are removed. Although the '831 patent provided a protective cover for an electrical junction box in either a horizontal or vertical orientation, it was quite complex to install, requiring the installer to pry, saw, or cut two tabs on the base and two hinges on the cover in order to create a base and cover assembly that would cooperate to enclose an electrical junction box of a given orientation.

The complexity of the aforementioned prior art indicates a need for a simpler device for protecting electrical devices installed in exterior electrical junction boxes orientated either horizontally or vertically.

SUMMARY OF THE INVENTION

The invention is a two-way cover for protecting electrical devices in exterior electrical junction boxes oriented either horizontally or vertically. The two-way cover includes an assembly comprised of a base member, middle member, and outer member. An arrangement is included for securing the base member to an electrical box. The outer member is rotatably attached to the assembly to form a first rotational cover unit. The middle member is also rotatably attached to the assembly such that the outer member and the middle member form a second rotational cover unit. The first rotational cover unit is capable of rotation in a first direction with respect to the assembly and the second rotational cover unit is capable of rotation in a second direction with respect to the assembly. When the assembly is secured to a vertically oriented junction box, the first rotational cover unit may be opened and closed to provide access to the box. When the assembly is secured to a horizontally oriented junction box, the second rotational cover unit may be opened and closed to provide access to the box. The two-way cover therefore provides a simple and convenient assembly for covering an outdoor electrical box oriented either vertically or horizontally without the need for separate inserts or removable tabs and hinges to accommodate the separate orientations.

OBJECTS AND ADVANTAGES

The two-way electrical box cover assembly of the present invention provides a cover for protecting an electrical junction box mounted in an exterior vertical wall in either a vertical or horizontal orientation.

One advantage of the two-way cover assembly is that it provides a simple device that is easily installed on either a vertically or horizontally oriented electrical junction box. All that is required is a simple rotation of the cover assembly to match the orientation of the junction box whereupon fasteners are applied to secure the cover assembly to the junction box.

The two-way cover therefore provides an advantage over prior art electrical box covers by eliminating the need for separate inserts or removable tabs and hinges, as are required on several prior art covers, to accommodate the separate possible orientations of the electrical junction box.

These and other objects and advantages of the present invention will be better understood by reading the following description along with reference to the drawings.

Table of Nomenclature

Figure 1:
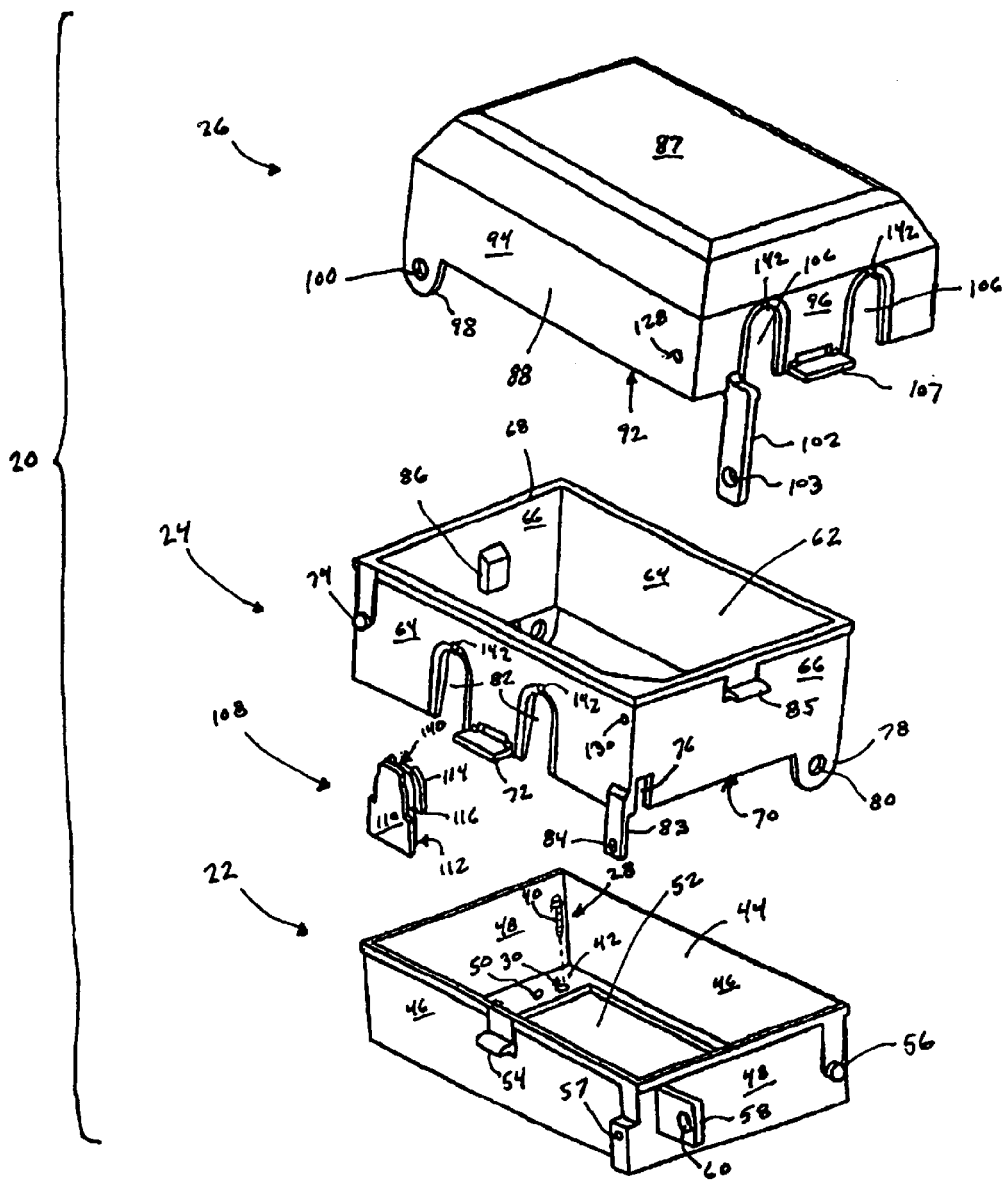
FIG. 1 is an exploded perspective view of a preferred embodiment of a two-way electrical box cover assembly according to the present invention.

The following is a listing of part numbers used in the drawings along with a brief description:

| Part Number | Description |
| --- | --- |
| 20 | two-way electrical box cover assembly |
| 22 | base member |
| 24 | middle member |
| 26 | outer member |
| 28 | securement arrangement |
| 30 | aperture in base member |
| 32 | vertically-oriented electrical junction box |
| 34 | horizontally-oriented electrical junction box |
| 36 | mounting plate of FS box |
| 38 | threaded apertures in mounting plate of FS box |
| 40 | threaded fasteners |
| 42 | back wall of base member |
| 44 | continuous peripheral side wall of base member |
| 46 | long side wall of base |
| 48 | short side wall of base |
| 50 | device-mounting aperture on base |
| 52 | central opening of base |
| 54 | latch-receiving tab of base |
| 56 | post on base member |
| 57 | first locking aperture on base |
| 58 | locking bar on base |
| 60 | second locking aperture on base |
| 62 | continuous peripheral side wall of middle member |
| 64 | long side wall of middle member |
| 66 | short side wall of middle member |
| 68 | top edge of middle member side wall |
| 70 | bottom edge of middle member side wall |
| 72 | latch on middle member |
| 74 | posts on middle member |
| 76 | groove in short side wall of middle member |
| 78 | post-engaging extensions on middle member |
| 80 | post apertures of middle member |
| 82 | cord openings in middle member |
| 83 | locking tab of middle member |
| 84 | locking aperture in tab of middle member |
| 85 | latch-receiving tab of middle member |
| 86 | projections from inner wall of middle member |
| 87 | top of outer member |
| 88 | continuous peripheral side wall of outer member |
| 92 | bottom edge of outer member side wall |
| 94 | long side wall of outer member |
| 96 | short side wall of outer member |
| 98 | post-engaging extensions on outer member |
| 100 | post apertures of outer member |
| 102 | locking bar |
| 103 | aperture in locking bar of outer member |
| 106 | cord openings in outer member |
| 107 | latch on outer member |
| 108 | tab insert |
| 110 | outer surface of tab insert |
| 112 | inner surface of tab insert |
| 114 | wings on tab insert |
| 116 | channel |
| 120 | first rotational cover unit |
| 121 | first latching arrangement |
| 122 | fastener |
| 124 | second rotational cover unit |
| 125 | second latching arrangement |
| 126 | fastener |
| 128 | aperture in outer member |
| 130 | aperture in middle member |
| 132 | electrical device or duplex receptacle |
| 134 | electrical cord |
| 135 | electrical outlet |
| 136 | bottom vertically of first rotational cover unit |
| 138 | bottom vertically of second rotational cover unit |
| 140 | tab on tab insert |
| 142 | cavity at top of cord openings |
| V | vertical axis |
| H | horizontal axis |
| D | downward direction vertically |

DETAILED DESCRIPTION OF THE INVENTION

The present invention comprises a two-way electrical box cover assembly for protecting an electrical junction box mounted in an exterior vertical wall in either a vertical or horizontal orientation.

With reference to FIG. 1 there is shown an exploded view of the components that comprise a preferred embodiment of a two-way electrical box cover assembly 20 according to the present invention. The two-way cover assembly 20 includes a base member 22, a middle member 24, and an outer member 26.

Figure 2:
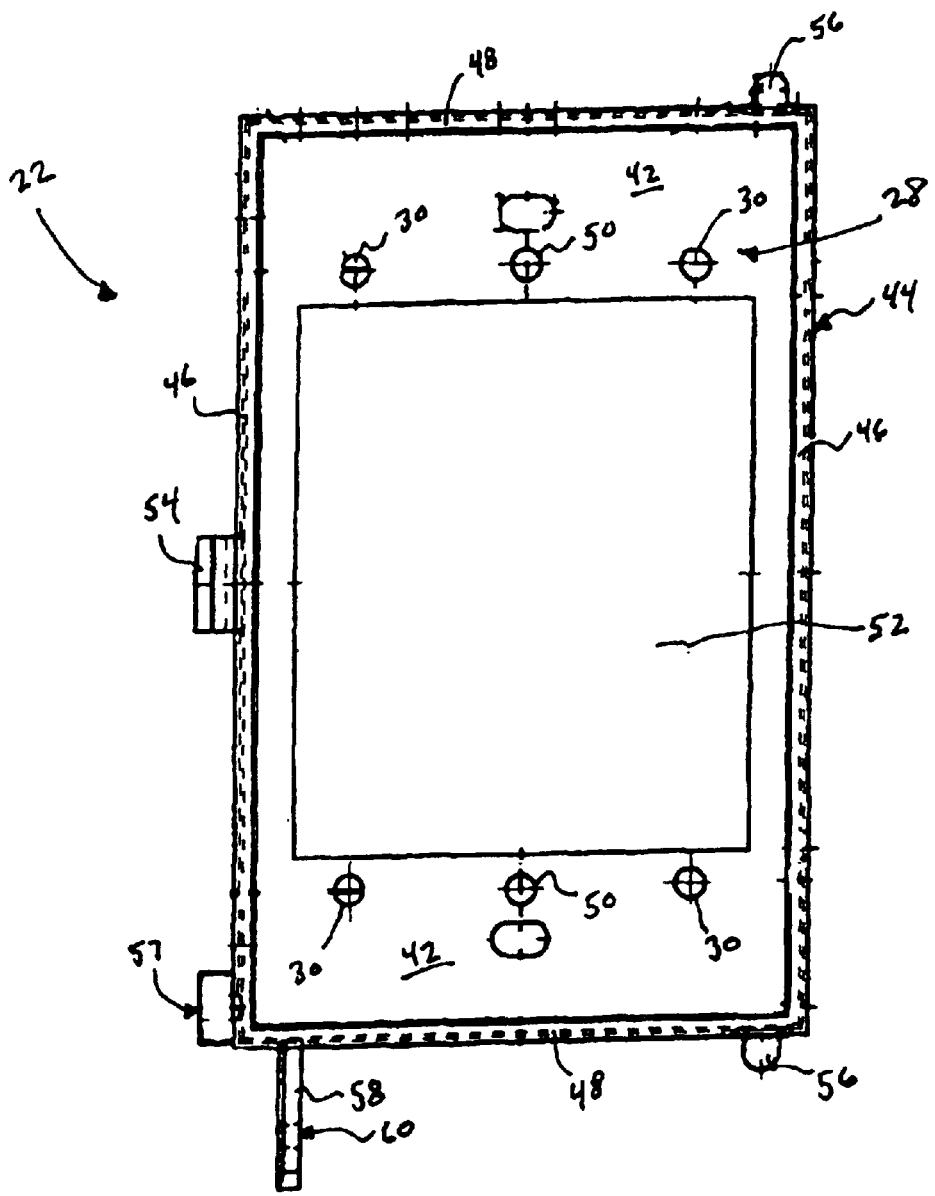
FIG. 2 is plan view of the base member of the two-way electrical box cover assembly of FIG. 1.
Figure 9:
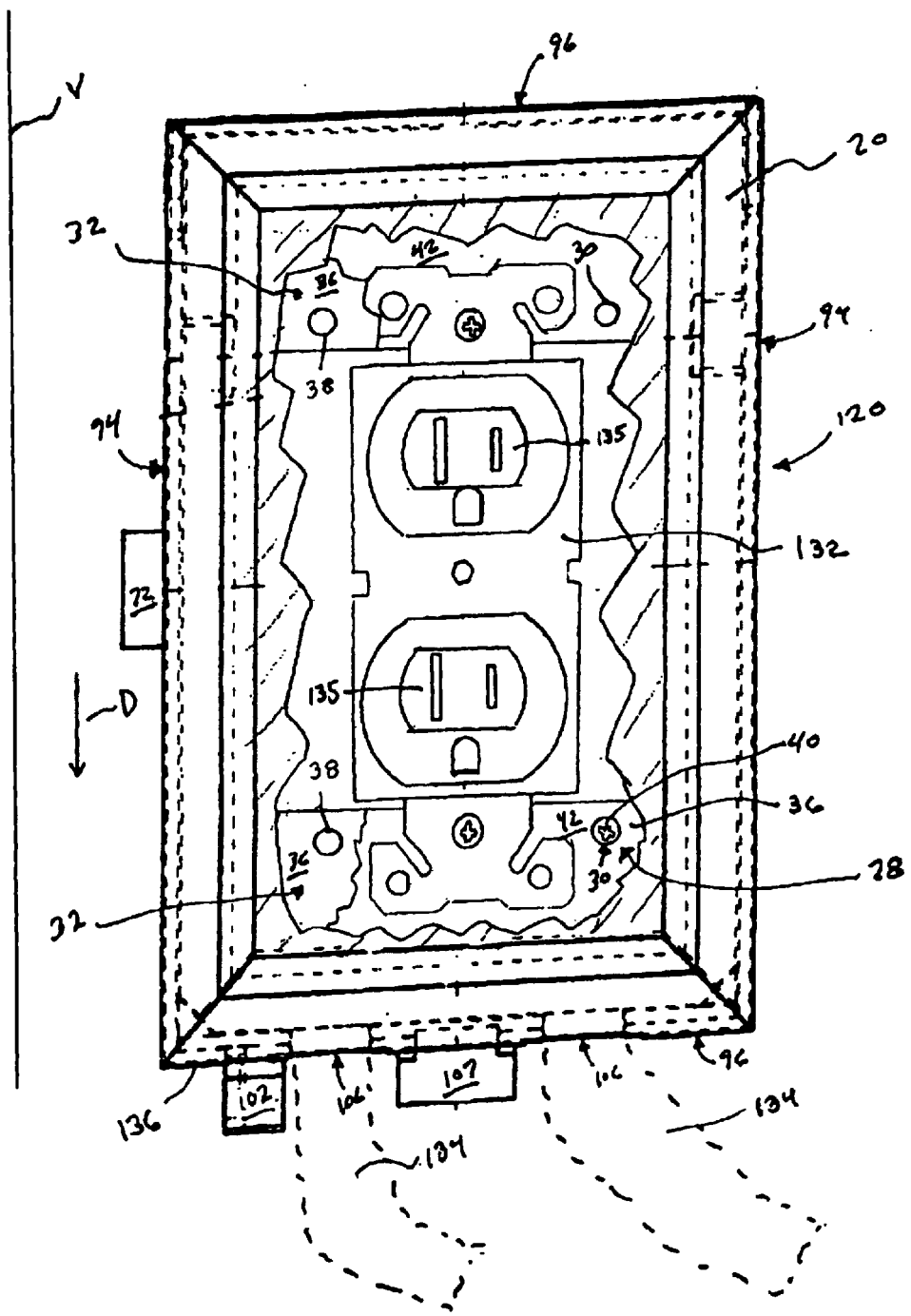
FIG. 9 is a elevation view of a closed two-way electrical box cover according to the present invention mounted to a vertically-oriented electrical junction box and with a portion of the cover broken away to depict the duplex receptacle mounted therein.

Referring to FIGS. 1, 2, and 9, the base member 22 includes a securement arrangement 28 for securing the cover assembly 20 to an electrical junction box 32 (see FIG. 9). The securement arrangement includes one or more apertures 30 in the base member 22, threaded apertures 38 in the mounting plate 36 of the electrical junction box 32 and one or more threaded fasteners 40.

Figure 10:
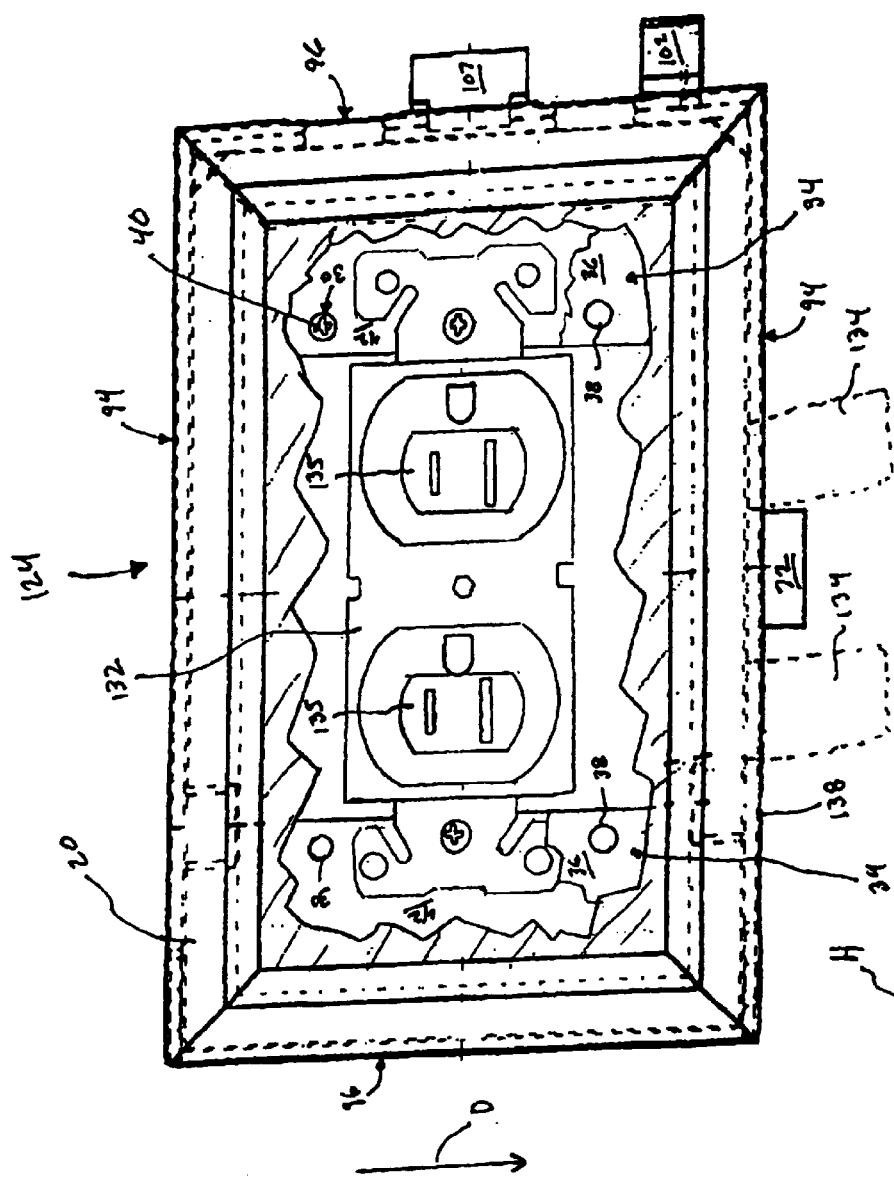
FIG. 10 is a elevation view of a closed two-way electrical box cover according to the present invention mounted to a horizontally-oriented electrical junction box and with a portion of the cover broken away to depict the duplex receptacle mounted therein.

A standard electrical junction box for use on a vertical exterior wall is commonly referred to in the industry as a field service or FS box. The two-way electrical box cover assembly 20 of the present invention can be easily mounted to either a vertically-oriented FS box 32, of which a portion is shown in FIG. 9, or a horizontally-oriented FS box 34, of which a portion is shown in FIG. 10. The apertures 30 in the base member 22 are of a spacing to match the apertures 38 in a standard FS box. The center portion of the two-way electrical box cover assembly 20 in FIG. 9 is broken away and a portion of the back wall 42 of the base member 24 is broken away to depict the mounting plate 36, which is an integral portion of a standard FS box 32. The mounting plate 36 of the standard FS box includes threaded apertures 38 to accept threaded fasteners 40 which are typically #6-32×½". To fit the two-way electrical box cover assembly 20 to a vertically-oriented FS box 32 such as depicted in FIG. 9, the cover assembly 20 is simply rotated until the apertures 30 in the base member 22 are in alignment with the threaded apertures 38 in the mounting plate 36 of the vertically-oriented FS box 32. To fit the two-way electrical box cover assembly 20 to a horizontally-oriented FS box 34 such as depicted in FIG. 10, the cover assembly 20 is simply rotated until the apertures 30 in the base member 22 are in alignment with the threaded apertures 38 in the mounting plate 36 of the horizontally-oriented FS box 34.

Referring to FIGS. 1 and 2, the base member 22 is of generally rectangular shape and includes a back wall 42, a continuous peripheral side wall 44 consisting of two long side walls 46 and two short side walls 48, box mounting apertures 30 and device mounting apertures 50 in the back wall 42, a central opening 52, a latch-receiving tab 54 projecting from one of the long side walls 46, two posts 56 projecting from the exterior of each of the short side walls 48, a first locking aperture 57 in one of the long side walls 46, and a locking bar 58 with a second locking aperture 60 therein.

Figure 3:
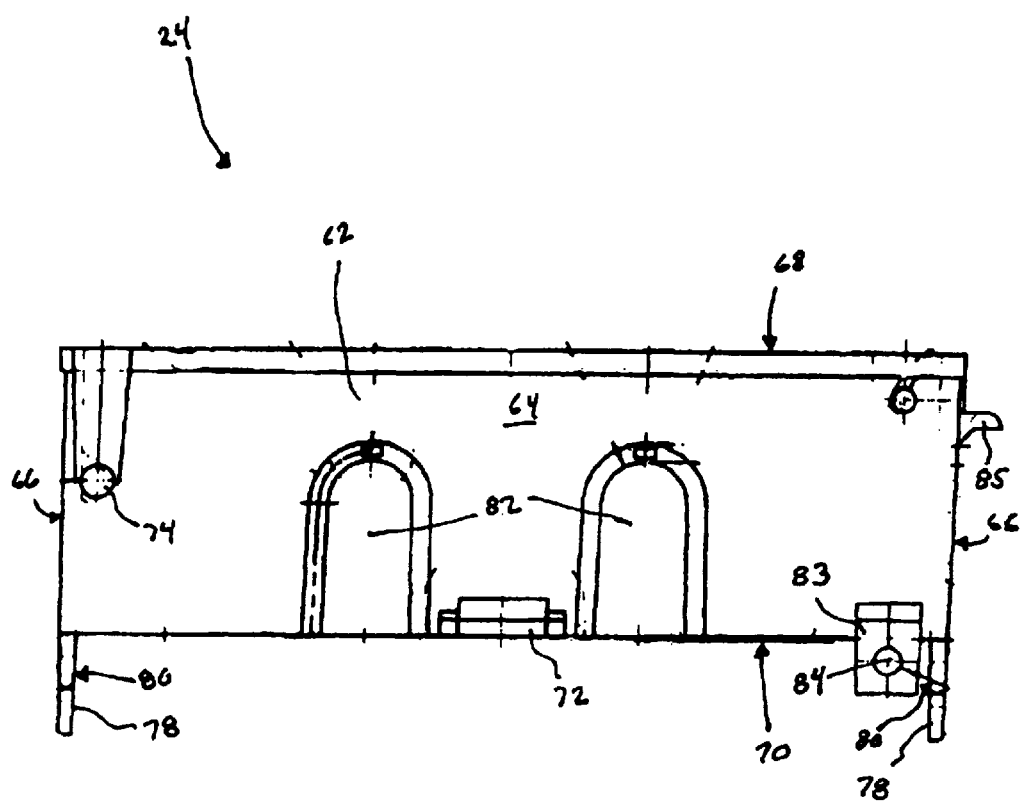
FIG. 3 is a side view of the middle member of the two-way electrical box cover assembly of FIG. 1.

With reference to FIGS. 1 and 3, the middle member 24 is of rectangular shape and includes a continuous peripheral side wall 62 consisting of two long side walls 64, two short side walls 66, and a top 68 and bottom edge 70. The middle member 24 also includes a latch 72 extending from one long side wall 64, two posts 74 projecting from each of the long side walls 64, a groove 76 in one of the short side walls 66, and two post-engaging extensions 78 projecting from the bottom edge 70 with post apertures 80 therein. Also included on one of the long side walls 64 of the middle member 24 are two cord openings 82. The cord openings 82 are located on the long side wall 64 opposite the long side wall 64 containing the two post-engaging extensions 78. A locking tab 83 extends from one of the short side walls 66 of the middle member 24 at the bottom edge 70 and includes a locking aperture 84 therein. A latch-receiving tab 85 extends from one of the short side walls 66 of the middle member 24. Two projections 86, one of which is visible in FIG. 1, extend from the inner surface of the short side walls 66 of the middle member 24.

Figure 4:
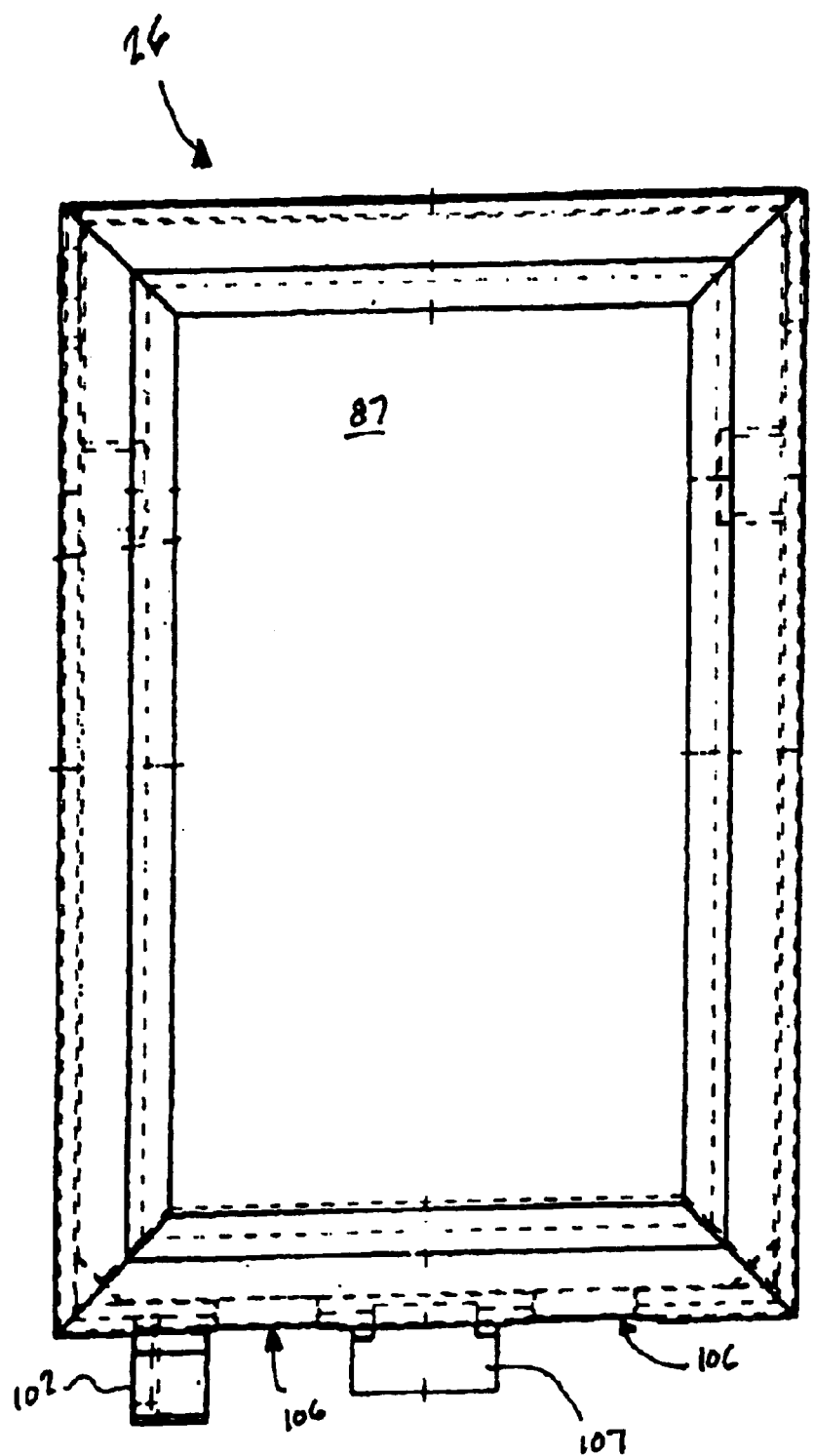
FIG. 4 is a plan view of the outer member of the two-way electrical box cover assembly of FIG. 1.
Figure 5:
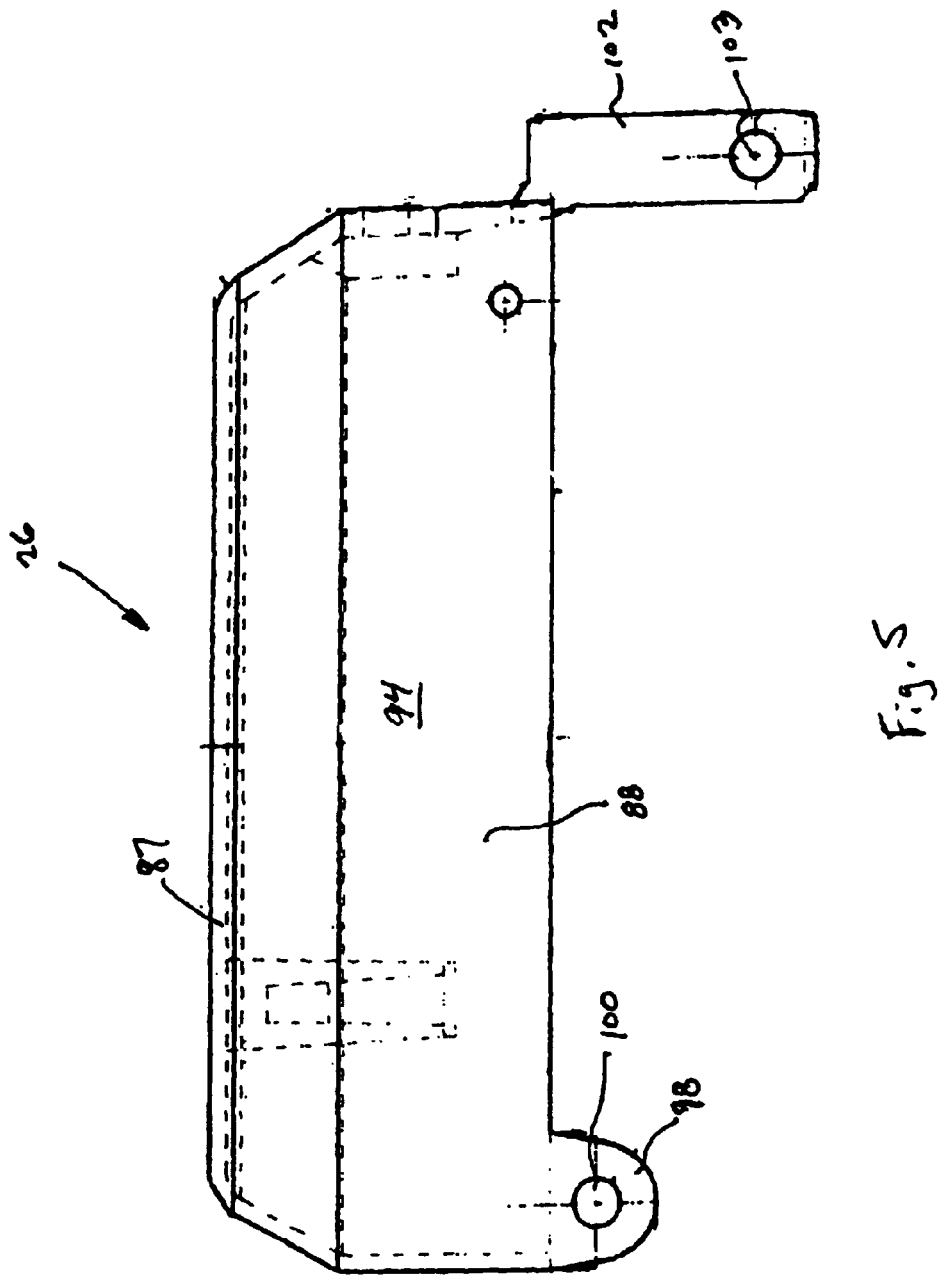
FIG. 5 is a side view of the outer member of FIG. 4.

Referring to FIGS. 1, 4 and 5, the outer member 26 includes a top 87, a continuous peripheral side wall 88 having a bottom edge 92, two long side walls 94, and two short side walls 96. Two post-engaging extensions 98 project from the bottom edge 92 of the long side walls 94 and include post apertures 100 therein. A locking bar 102 having an aperture 103 therein extends from one short side wall 96 at its bottom edge 92 and a latch 107 extends from one short side wall 96 at the bottom edge 92. Two cord openings 106 and a latch 107 are included in one short side wall 96 of the outer member 26.

Figure 7:
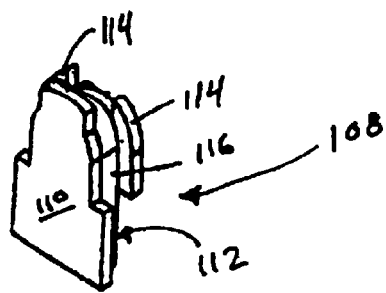
FIG. 7 is a perspective view of a tab insert according to the present invention.

Referring to FIGS. 1 and 7, the cover assembly 20 of the present invention includes a tab insert 108. The tab insert 108 includes an outer 110 and inner 112 surface with two wings 114 projecting from the inner surface 112 and a channel 116 situated between the outer surface 110 and the wings 114.

Figure 6:
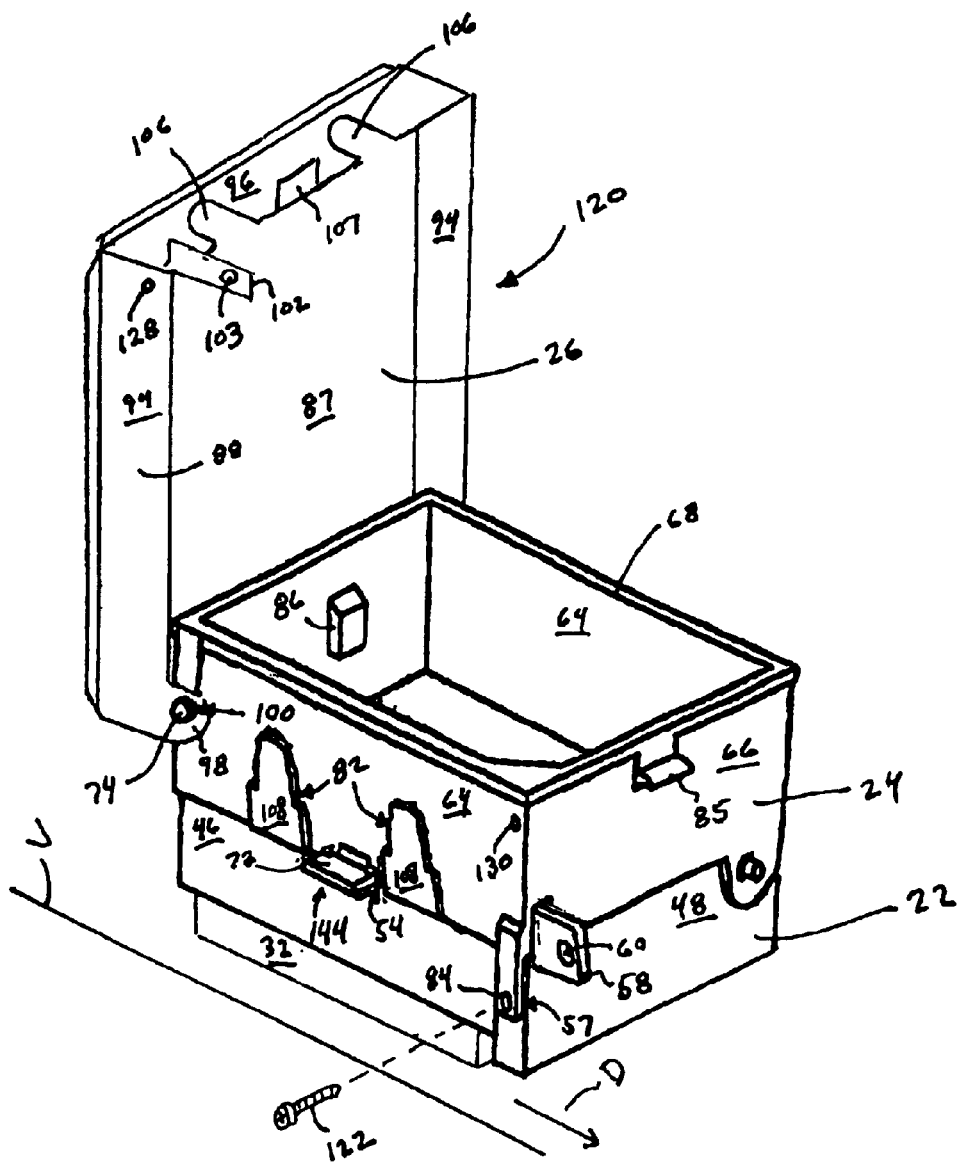
FIG. 6 is a perspective view of the two-way electrical box cover assembly of FIG. 1 with the first rotational cover unit, comprised of the outer member rotatably attached to the middle member, depicted in the open position.

The operation of the two-way cover assembly 20 when secured to a vertically oriented junction box will become apparent with reference to FIGS. 1 and 6. The cover assembly 20, composed of the base member 22, middle member 24, and outer member 26 is capable of opening two ways depending on the orientation of the junction box that it will be secured to. When the cover assembly 20 is used with a vertically aligned junction box, the cord openings 82 in the middle member 24 will not be utilized, and two tab inserts 108 can be snapped into the cord openings 82 of the middle member 24 to close off the openings 82. FIG. 6 depicts the cover assembly 20 with tab inserts 108 snapped into the cord openings 82 of the middle member 24. For use with a vertically oriented junction box 32, the outer member 26 is rotatably attached to the assembly 20 to form a first rotational cover unit 120. The post apertures 100 in the post-engaging extensions 98 on the outer member 26 engage the posts 74 of the middle member 24 to make the outer member 26 rotatable with respect to the middle 24 and base 22 of the cover assembly 20 and thereby create the first rotational cover unit 120. As shown in FIG. 6, for use with a vertically oriented electrical junction box, the middle member 24 can be latched to the base member 22 by snapping the latch 72 of the middle member 24 onto the latch-receiving tab 54 of the base member 22. The latch 72 of the middle member 24 and the latch-receiving tab 54 of the base member 22 function as a first latching arrangement 121 to latch the middle 24 and base 22 members together and thereby allow them to remain secured to the vertically-oriented electrical junction box 32 while the first rotational cover unit 120 is able to rotate from an open to a closed position. Additionally, when the cover assembly 20 of the present invention is used to cover a vertically-oriented junction box, a fastener 122, such as that shown in FIG. 6, can be driven through the locking aperture 84 of the middle member 24 and into the first locking aperture 57 on the base member 22 to further secure the middle member 24 to the base member 22.

Figure 8:
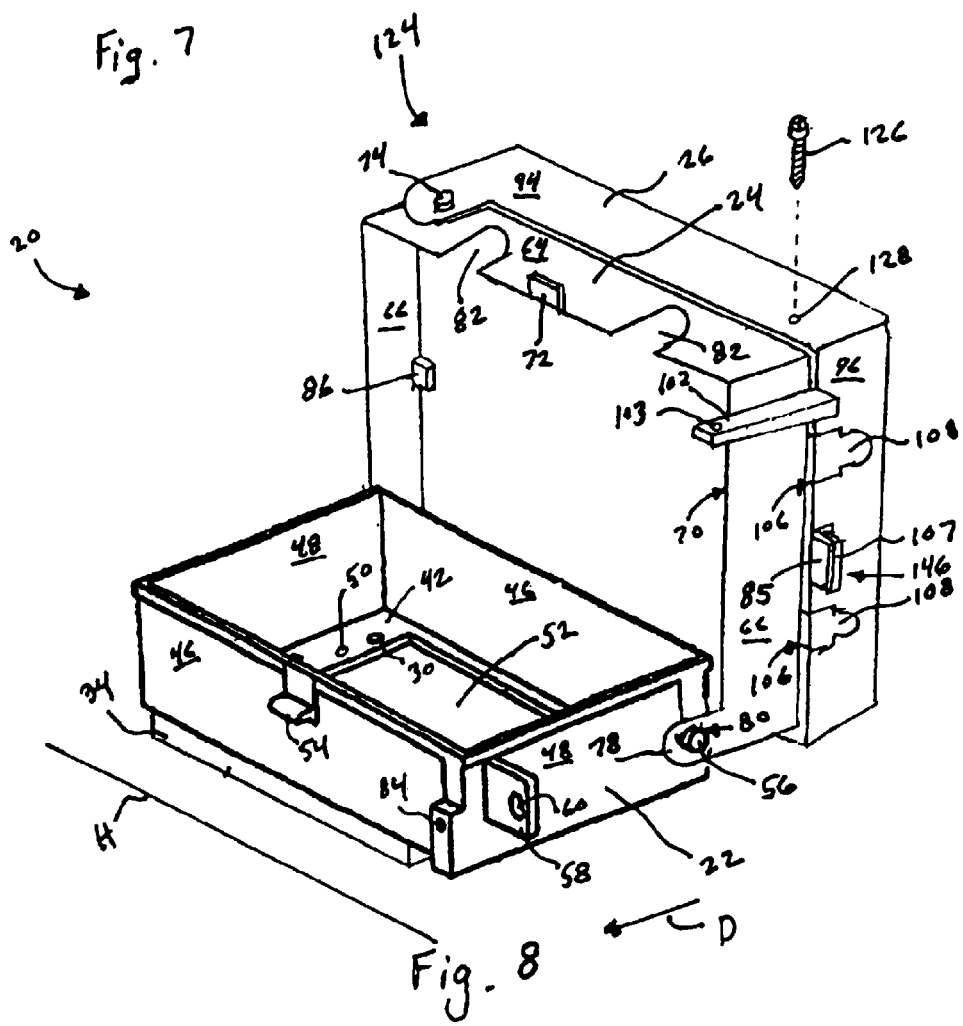
FIG. 8 is a perspective view of the two-way electrical box cover assembly of FIG. 1 with the second rotational cover unit, comprised of the outer member and middle member rotatably attached to the base member, depicted in the open position.

The operation of the two-way cover assembly 20 when secured to a horizontally oriented junction box 34 will become apparent with reference to FIGS. 1 and 8. When the cover assembly 20 is used to protect a horizontally aligned junction box 34, the cord openings 106 in the outer member 26 will not be utilized, and two tab inserts 108 can be snapped into the cord openings 106 of the outer member 26 to close off the openings 106. FIG. 8 depicts the cover assembly 20 with tab inserts 108 snapped into the cord openings 106 of the outer member 26. For use with a horizontally oriented junction box, the middle member 24 is rotatably attached to the cover assembly 20 to form a second rotational cover unit 124. The post apertures 80 in the post-engaging extensions 78 on the middle member 24 engage the posts 56 of the base member 22 to make the outer 26 and middle 24 members rotatable with respect to the base 22 member of the cover assembly 20 thereby forming a second rotational cover unit 124. As shown in FIG. 8, for use with a horizontally oriented electrical junction box 34, the outer member 26 can be latched to the middle member 24 by snapping the latch 107 of the outer member 26 onto the latch-receiving tab 85 of the middle member 24. The latch 107 of the outer member 26 and the latch-receiving tab 85 of the middle member 24 function as a second latching arrangement 125 to latch the outer 26 and middle 24 members together and thereby allow them to remain secured to the horizontally-oriented electrical junction box 34 while the second rotational cover unit 124 is able to rotate from an open to a closed position. Additionally, when the cover assembly 20 of the present invention is used to cover a horizontally oriented junction box 34, a fastener 126, such as that shown in FIG. 8, can be driven through the an aperture 128 in one long side wall 94 of the outer member 26 and into an aperture 130 in one long side wall 64 of the middle member 24 to further secure the outer member 26 to the middle member 24.

FIGS. 6 and 9 illustrate the use of the two-way cover assembly 20 according to the present invention to provide a rainproof cover for an exterior electrical outlet mounted in an FS box 32 in a vertical orientation. To fit the two-way electrical box cover assembly 20 to a vertically-oriented FS box 32 such as depicted in FIG. 9, the cover assembly 20 is simply rotated until the apertures 30 in the base member 22 are in alignment with the threaded apertures 38 in the mounting plate 36 of the vertically-oriented FS box 32. Threaded fasteners 40 are then driven through the apertures 30 in the back wall 42 of the base member 22 and into the threaded apertures 38 in the mounting plate 36 of the FS box 32 to secure the cover assembly 20 to the vertically oriented FS box 32. The middle member 24 can then be latched to the base member 22 and, if desired, a fastener 122 can be driven through the locking aperture 84 of the middle member 24 and into the first locking aperture 57 on the base member 22 to further secure the middle member 24 to the base member 22. With the middle 24 and base 22 members locked together, the first rotational cover unit 120 can then be rotated to the open or closed position as desired. In the open position, as depicted in FIG. 6, the first rotational cover unit 120 is lifted to the open position to access the electrical device therein, which in FIG. 9 is a duplex receptacle 132. Alternatively, the first rotational cover unit 120 can be closed to protect the electrical device 132 therein from rain, water spray, or other environmental elements. The "V" axis denotes vertical orientation and the arrow marked "D" denotes a downward direction with respect to the exterior of a house. The FS box 32 of FIGS. 6 and 9 is therefore oriented vertically and the long side 94 of the outer member 26 is also oriented vertically. Thus, when the first rotational cover unit 120 is closed, with the latch 107 on the outer member 26 snapped onto the latch-receiving tab 85 of the middle member 24, any rainfall or water spray will run off of the closed cover assembly 20 and not enter the FS box 32 or electrical device 132 mounted therein. The final closed cover assembly 20 secured to a vertically oriented FS box 32 is shown in FIG. 9. Any rainfall or water spray would typically fall vertically, in the direction of the arrow "D", and run off of the closed cover assembly 20. With the first rotational cover unit 120 closed, as in FIG. 9, any electrical cords 134 plugged into the electrical outlets 135 can remain plugged in without any danger of rain or water entering the FS box 32, as the cord openings 106 will be situated on the bottom 136 of the first rotational cover unit 120.

FIGS. 8 and 10 illustrate the use of the two-way cover assembly 20 according to the present invention to provide a rainproof cover for an exterior electrical outlet mounted in an FS box 34 in a horizontal orientation. To fit the two-way electrical box cover assembly 20 to a horizontally-oriented FS box 34 such as depicted in FIG. 10, the cover assembly 20 is simply rotated until the apertures 30 in the base member 22 are in alignment with the threaded apertures 38 in the mounting plate 36 of the horizontally-oriented FS box 34. Threaded fasteners 40 are then driven through the apertures 30 in the back wall 42 of the base member 22 and into the threaded apertures 38 in the mounting plate 36 of the FS box 34 to secure the cover assembly 20 to the horizontally-oriented FS box 34. The outer member 26 can then be latched to the middle member 24 and, if desired, a fastener 126 can be driven through the aperture 128 in the outer member 26 and into the aperture 130 (see FIG. 1) in the middle member 24 to further secure the outer member 26 to the middle member 24. With the outer 26 and middle 24 members locked together, the second rotational cover unit 124 can then be rotated to the open or closed position as desired. In the open position, as depicted in FIG. 8, the second rotational cover unit 124 is lifted to the open position to access the electrical device therein, which in FIG. 8 is a duplex receptacle 132. Alternatively, the second rotational cover unit 124 can be closed to protect the electrical device 132 therein from rain, water spray, or other environmental elements. The "H" axis denotes horizontal orientation and the arrow marked "D" denotes a downward direction with respect to the exterior of a house. The FS box 34 of FIGS. 8 and 10 is therefore oriented horizontally and the long side 94 of the outer member 26 is also oriented horizontally. Thus, when the second rotational cover unit 124 is closed, with the latch 72 on the middle member 24 snapped onto the latch-recieving tab 54 of the base member 22, any rainfall or water spray will run off of the closed cover assembly 20 and not enter the FS box 34 or electrical device 132 mounted therein. The final closed cover assembly 20 secured to a horizontally-oriented FS box 34 is shown in FIG. 10. Any rainfall or water spray would typically fall vertically, in the direction of the arrow "D", and run off of the closed cover assembly 20. With the second rotational cover unit 124 closed, as in FIG. 10, any electrical cords 134 plugged into the outlets 135 can remain plugged in without any danger of rain or water entering the FS box 34, as the cord openings will be situated on the bottom 138 of the second rotational cover unit 124.

Thus, the first rotational cover unit 120 is capable of rotation in a first direction with respect to the cover assembly 20, or capable of opening and closing in a direction parallel to the "V" axis, which is parallel with the long side 94 of the cover assembly in FIG. 9. As shown in FIG. 10, the second rotational cover unit 124 is capable of rotation in a second direction with respect to the cover assembly 20, or capable of opening and closing in a direction parallel to the axis of the "D" arrow, which is parallel with the short side 96 of the cover assembly 20 in FIG. 10.

The separate members that comprise the two-way cover assembly of the present invention, including the base member 22, middle member 24, outer member 26, and tab insert 108, are typically molded in one piece of plastic. Suitable plastics that can be used to produce the molded pieces are polycarbonate, polyvinylchloride, polystryrene, or acrylonitrile-butadiene styrene.

Being molded of plastic, the separate pieces, as shown in FIG. 1, are somewhat flexible, thereby allowing the post-engaging extensions 78 on the middle member 24 to slip over and engage the posts 56 on the base member 22 and the post-engaging extensions 98 on the outer member 26 to slip over and engage the posts 74 on the middle member.

Figure 11:
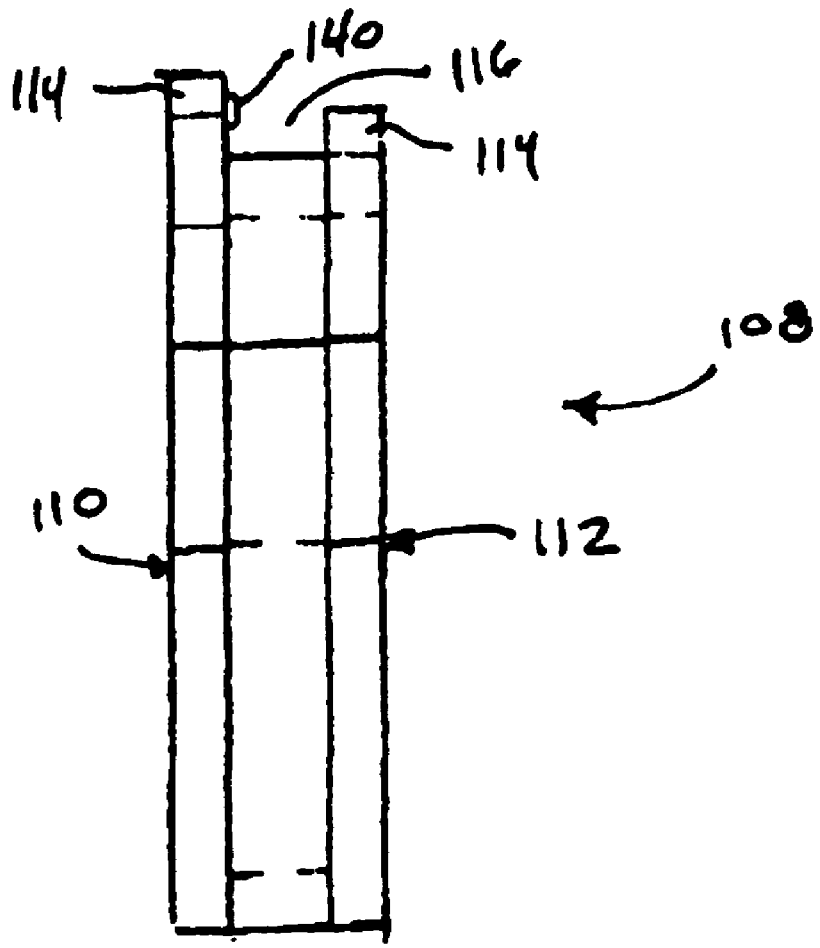
FIG. 11 is a side view of the tab insert according of FIG. 7.

Referring to FIG. 11, the tab insert 108 further includes a tab 140 extending into the channel 116. As shown in FIG. 1, a cavity 142 is located in the side wall 62 and 88 at the top of each cord opening 82 and 106 in the middle 24 and outer 26 members respectively. The width of the channel 116 is typically 0.135 inch and the tab 140 extends 0.015 inch into the channel thereby creating a gap of 0.120 inch between the end of the tab 140 and the opposite side of the channel. The cavity typically is of a height and width to accept the tab 140 and is typically 0.030 inch in depth. The thickness of the side wall 62 of the middle member 24 and side wall 88 of the outer member 26 is typically 0.125 inch. The side walls 62 and 88 of the two members 24 and 26 taper in thickness at their bottom edges 70 and 92 respectively, to a lesser thickness of approximately 0.625 inch. Therefore, the tab inserts 108 can easily be snapped into the cord openings 82 and 106 in the middle member 24 and outer member 26 respectively by slipping the channel 116 portion of the tab insert 108 around the bottom edges 70, 92 of the side walls 62, 88. The channel 116, being 0.135 inch in width, eventually tightens upon the side walls 62, 88 as it slides beyond the thinner bottom edges 70, 92. Eventually, the tab 140 snaps into the cavity 142 thereby locking the tab insert 108 into the cord openings 82 and 106.

Referring to FIG. 1, the outer 26, middle 24, and base 22 members are all generally rectangular shaped and each have a peripheral side wall. The peripheral side wall 88 of the outer member 26 is typically sized to fit over the peripheral side wall 62 of the middle member 24. The outer dimension of the outer member 26 as measured across the outer surfaces of the side wall 88 is typically 5.550 inch length by 3.728 inch width and the inner dimension as measured across the inner surfaces is typically 5.335 inch by 3.550 inch. The outer dimension of the middle member 24 as measured across the outer surfaces of the side wall 62 is typically 5.230 inch length by 3.504 inch width and the inner dimension as measured across the inner surfaces is typically 4.956 inch by 3.284 inch. The outer dimension of the base member 22 as measured across the outer surfaces of the peripheral side wall 44 is typically 4.886 inch length by 3.146 inch width and the inner dimension as measured across the inner surfaces is typically 4.690 inch by 2.950 inch. Therefore, as shown by these dimensions, the first rotational cover unit 120 comprised of the outer member 26 rotatably attached to the two-way cover assembly 20, as shown in FIG. 6, will fit over the middle member 24 of the cover assembly 20. The peripheral side wall 88 of the outer member 26 will therefore nest over the peripheral side wall 62 of the middle member 24 when the first rotational cover unit 120 is closed upon the assembly 20. Likewise, the second rotational cover unit 124 comprised of the outer 26 and middle 24 members rotatably attached to the base member 22 of the two-way cover assembly 20, as shown in FIG. 8, will fit over the base member 22 of the cover assembly 20. The peripheral side wall 62 of the middle member 24 will therefore nest over the peripheral side wall 44 of the base member 22 when the second rotational cover unit 124 is closed upon the assembly 20. The depth of the side wall 88 of the outer member 26 is typically 1.813 inch, the depth of the side wall 62 of the middle member 24 is typically 1.625 inch, and the depth of the peripheral side wall 44 of the base member 22 is typically 1.250 inch. When the first 120 and second 124 rotational cover units are closed, the side wall 88 of the outer member 26 typically overlaps the side wall 62 of the middle member 24 by 0.5 inch, and the side wall 62 of the middle member 24 typically overlaps the side wall 44 of the base member 22 by 0.5 inch. This overlap furthermore acts to seal the cover assembly 20 and the FS box it is secured to against rain and water spray, as the nested nature of the side walls encourages water to run off of the closed assembly.

Having thus described the invention with reference to a preferred embodiment, it is to be understood that the invention is not so limited by the description herein but is defined as follows by the appended claims.

What is claimed is:

1. A two-way cover comprising:
   an assembly including a base member, a middle member, and an outer member;
   said middle member rotatably attached to said base member;
   said outer member rotatably attached to said middle member to form a first rotational cover unit;
   said outer member and said middle member forming a second rotational cover unit;
   said first rotational cover unit capable of rotation in a first direction with respect to said assembly; and
   said second rotational cover unit capable of rotation in a second direction with respect to said assembly.

2. A method of covering a box including:
   providing an assembly including a base member, a middle member having a side wall, an outer member having a side wall, a securement arrangement for securing said base member to a box with apertures therein, said securement arrangement including apertures in said base member and fasteners, said outer member rotatably attached to said assembly to form a first rotational cover unit capable of rotation in a first direction with respect to said assembly, said outer member and said middle member attached rotatably to said assembly to form a second rotational cover unit capable of rotation in a second direction with respect to said assembly, a first latching arrangement for latching said middle member to said base member; and a second latching arrangement for latching said outer member to said middle member; cord openings in said side wall of said outer member; cord openings in said side wall of said middle member; and tab inserts for closing off said cord openings;
   determining if said box is oriented vertically or horizontally;
   if box is oriented vertically:
      aligning said apertures in said base member with said apertures in said vertically oriented box, said apertures in alignment thereby positioning said cord openings in said side wall of said outer member on the bottom side of said vertically oriented box;
      securing said assembly to said box with said fasteners through said apertures of said base member into said apertures of said vertically oriented box;
      sliding said tab inserts into said cord openings in said side wall of said middle member; and
      latching said middle member to said base member with said first latching arrangement to enable said first rotational cover unit to rotate from a closed to an open position while said middle and said base members remain latched together and secured to said vertically oriented box;
   if box is oriented horizontally:
      aligning said apertures in said base member with said apertures in said horizontally oriented box, said apertures in alignment thereby positioning said cord openings in said side wall of said middle member on the bottom side of said horizontally oriented box;
      securing said assembly to said box with said fasteners through said apertures of said base member into said apertures of said horizontally oriented box;

sliding said tab inserts into said cord openings in said side wall of said outer member; and latching said outer member to said middle member with said second latching arrangement to enable said second rotational cover unit to rotate from a closed to an open position while said base member remains secured to said horizontally oriented box and said cord openings in said middle member are located at the bottom end of said assembly.

* * * * *